United States Patent [19]

Kikuchi

[11] Patent Number: 5,076,395

[45] Date of Patent: Dec. 31, 1991

[54] PORTABLE SLOW DESCENDER

[76] Inventor: Takeshi Kikuchi, 6-23, Shinmei-cho, Morioka-Shi, Iwate-Ken 020, Japan

[21] Appl. No.: 629,610

[22] Filed: Dec. 18, 1990

Related U.S. Application Data

[63] Continuation-in-part of Ser. No. 392,992, filed as PCT/JP87/00907. Nov. 19, 1987, Pat. No. 4,986,390.

[30] Foreign Application Priority Data

Dec. 8, 1986 [JP] Japan .......................... 61-189455[U]

[51] Int. Cl.[5] .......................... A62B 1/08; A62B 1/10; F16D 59/00

[52] U.S. Cl. .................................. 182/234; 182/235; 182/239

[58] Field of Search ....................................... 182/5-8, 182/234, 239, 235

[56] References Cited

U.S. PATENT DOCUMENTS

| | | | |
|---|---|---|---|
| 286,306 | 10/1883 | Johnson | 182/239 |
| 1,037,333 | 9/1912 | Scheuer | 182/239 |
| 1,435,366 | 11/1922 | Bassett | 182/239 |
| 1,782,951 | 11/1930 | Abbott | 182/239 |
| 2,479,459 | 8/1949 | Bassett | 182/234 |
| 2,729,425 | 1/1956 | Gschwind | 182/239 |
| 3,150,744 | 9/1964 | Fertier | 182/239 |
| 4,457,400 | 7/1984 | Donaldson | 182/239 |
| 4,986,390 | 1/1991 | Kikuchi | 182/234 |

*Primary Examiner*—Reinaldo P. Machado

[57] ABSTRACT

A portable slow-descending device is provided in which a lifeline in the form of a tape is selectively dispensed from a reel around which the lifeline is wound. A planetary gear mechanism and a centrifugal brake mechanism are housed within a cylinder portion of the reel and a manual control member may be provided in connection therewith for locking the centrifugal brake mechanism during descent of the device. All operable elements of the device are within reach of and descend with a victim so that the victim may personally ensure his safe, controlled descent. The lifeline is preferably formed of aramid fibers which may be formed into a tape of at least 100 m in length and is resistant to elemental fatigue. Heat transfer from the centrifugal brake to the gear mechanism may be reduced by projecting the centrifugal brake from one side of the device and appearance thereof may be streamlined by encapsulating the device within a unitary housing.

5 Claims, 4 Drawing Sheets

PORTABLE SLOW DESCENDER

This is a continuation-in-part of application Ser. No. 07/392,992 filed as PCT/JP87/00907, Nov. 19, 1987 and Issued on Jan. 22, 1991 as U.S. Pat. No. 4,986,390.

BACKGROUND OF THE INVENTION

1. Field of the Invention

This invention relates to a device used for evacuation from a high building in case of a fire, particularly to a slow-descending device for evacuation which enables a person to descend safely from a high place, and more particularly to a portable slow-descending device for evacuation which anybody can carry for personal use.

2. Description of Related Art

Although a building or other type of structure is usually equipped with evacuation devices, they are not provided in every room, but are provided only in selected rooms, or at particular sites of one or more corridors. In the case of a fire, for example, it is very likely that many people may rush to each evacuation device and cause a panic, or it is even likely that fire or smoke may prevent people from reaching any of the places where those devices are provided, and to use them.

An evacuation device having a lifeline formed from a metal wire is heavy and unsuitable for portable use. Moreover, it has a limit in the distance along which it enables a person to descend, i.e., the height of the building from which it enables the person to descend. Its use is limited to a low building having a height of, say, 30 m at a maximum. There is every likelihood that a person using a lifeline formed of a metal wire to escape from a high building may be suspended in the air. Thus, it has only a limited scope of use. There has also been proposed a device which includes a wire having a smaller diameter and a longer length. However, these devices are not only heavy, but are also subject to rusting by salt or moisture. Therefore, it is unsuitable as a device of the kind under consideration which is required to be semi-permanently useful without undergoing any substantial change in quality.

There has also been proposed a device which includes a lightweight rope formed from a non-metallic material. It is, however, likely that when a load is applied to the rope extending down from a reel or the like on which it is wound, it may be deformed and caught between coils thereof on the reel, resulting in a failure of the rope to be smoothly unwound and the failure of the reel to turn smoothly, and a person who is being rescued may, therefore, be suspended in the air.

There are known various types of mechanisms for slow-descending devices. A device employing a hydraulic system is likely to have a greatly varying descending speed which may depend on the weight of a person who is rescued. When it is used in a very cold place, oil is likely to solidify. Moreover, a change in quality of oil or its leakage is likely to occur.

It is an object of this invention to provide a portable slow-descending device which can overcome the drawbacks of the devices described hereinabove.

SUMMARY OF THE INVENTION

The portable slow-descending device of the present invention comprises a lifeline in the form of a tape made of synthetic or chemical fibers, a hook attached to one end of the lifeline, a reel on which the lifeline is wound, a frame for supporting a reel supporting shaft rotatably at both ends thereof, a suspending ring or the like connected to the frame and adapted for connecting the device to a person using it, a planetary gear acceleration unit embedded in the reel, and a centrifugal brake mechanism linked to the planetary gear acceleration unit. In one embodiment, the centrifugal brake mechanism protrudes or projects to a side of the device in a spaced apart relationship with respect to the gear unit. Further, the embodiment having a projecting brake mechanism is encapsulated.

The lifeline is preferably made of aramid fibers.

The device may also include a manual control member for selectively locking the centrifugal brake mechanism.

Moreover, the device preferably includes a manual member for rewinding the lifeline on the reel.

DESCRIPTION OF PREFERRED EMBODIMENTS

Figure 1:
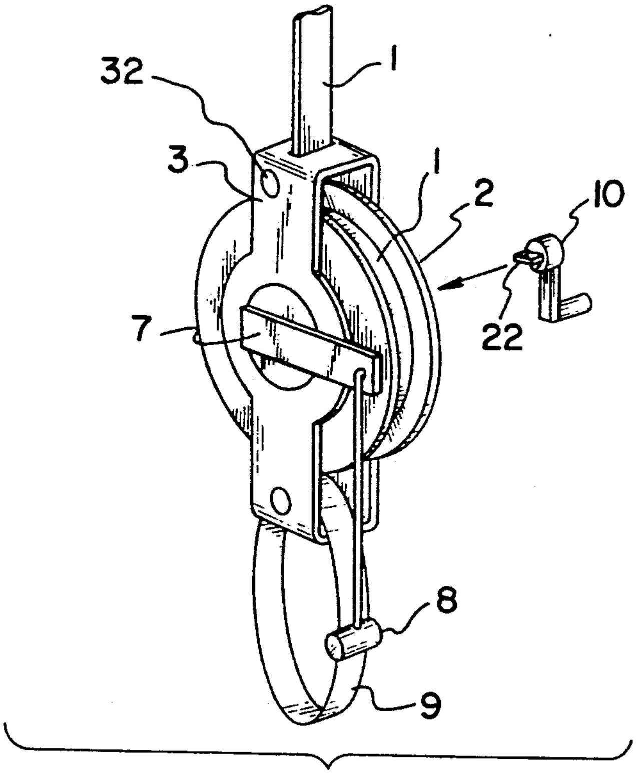
FIG. 1 is a perspective view showing the major part of a portable slow-descending device of a first preferred embodiment of this invention.

A device showing a first preferred embodiment of the present invention is generally shown in FIG. 1. It includes a lifeline 1 in the form of a tape made of synthetic or chemical fibers, and wound in successive layers on a reel 2. The lifeline 1 has one end not shown, but provided with an appropriately shaped hook which is used for fastening the lifeline 1 to an appropriate part of a building. The reel 2 is supported on a shaft 18 which is rotatably supported on a supporting frame 3 at both ends thereof.

Figure 2:
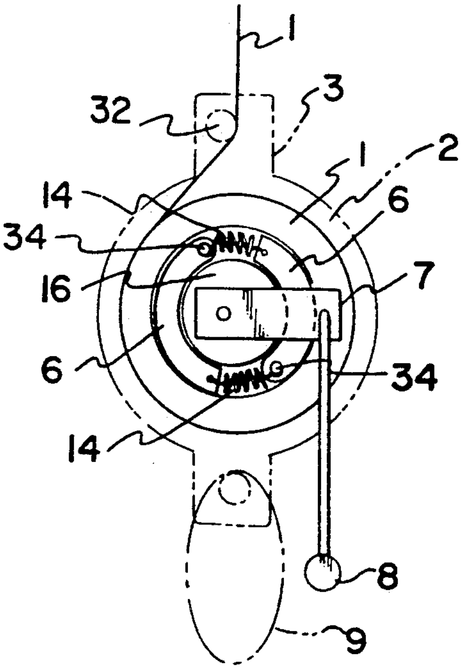
FIG. 2 is a schematic view showing a centrifugal brake mechanism and a manual control member for the device shown in FIG. 1.
Figure 3:
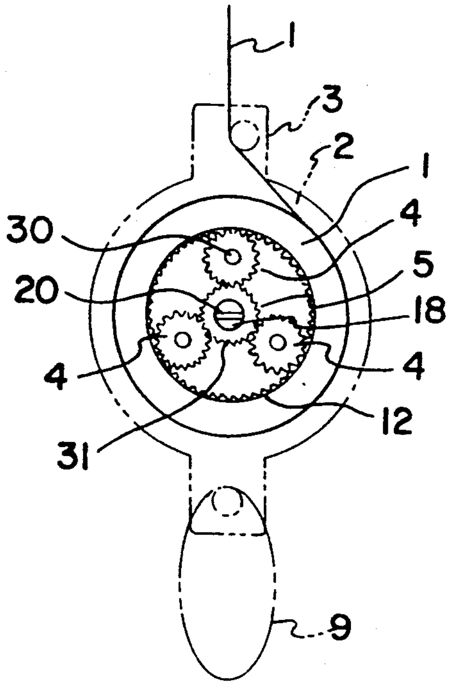
FIG. 3 is a schematic view showing a planetary gear acceleration unit for the device shown in FIG. 1.
Figure 4:
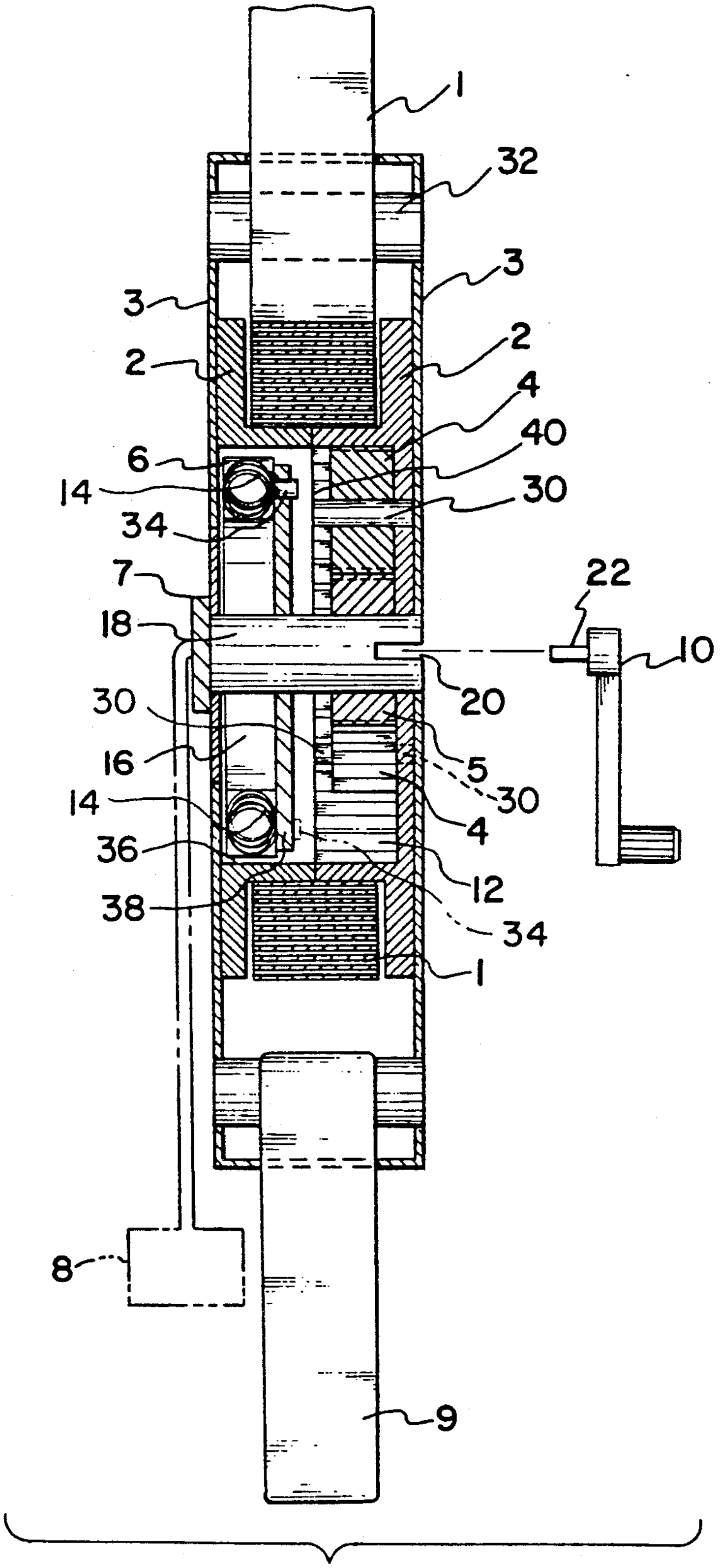
FIG. 4 is a cross-sectional view showing details of the relationship between the centrifugal brake chamber of FIG. 2 and the planetary gear chamber of FIG. 3.

A centrifugal brake mechanism, which is schematically shown in FIG. 2, and a planetary gear acceleration unit, which is schematically shown in FIG. 3, are juxtaposed against each other in the interior of the reel 2 and separated by wall 40 as shown in FIG. 4. The planetary gear acceleration unit comprises three equally spaced apart planetary pinions 4 rotating about the shafts 30, a sun gear 5 meshing with the pinions 4, and a large planet gear 12 secured to the reel 2 and meshing with the pinions 4. The centrifugal brake mechanism includes a centrifugal weight 6 which surrounds a shaft 18 of the sun gear 5 and rotates with rotation of the sun gear 5. The centrifugal weight, which is schematically shown in FIG. 2 is of the type comprising two substantially semilunar members 6, 6 which are fixed at points 34 to a shoe holder 38 integrally connected to the shaft 18 as is sun gear 5 and normally urged radially inwardly toward each other by springs 14 against an inner periphery 36 of reel 2. It is, however, possible to use any other type of centrifugal weight known in the art.

The centrifugal brake mechanism further includes a cam 16 provided in its center, a manual brake arm 7 connected to the cam 16, and a knob 8 connected to the arm 7. A suspending ring 9 is connected to the frame 3, but may be replaced by a life jacket or any other similar device. The shaft 18 on which the sun gear 5 is supported has one end provided with a recess 20 into which a handle 10 having corresponding protrusion 22 for rewinding the tape can be connected.

FIG. 4 is a cross-sectional view showing details of the relationship between the centrifugal brake chamber of FIG. 2 and the planetary gear chamber of FIG. 3.

The lifeline 1 in the form of tape is preferably formed from synthetic or chemical fibers, such as aramid fibers (Kepler). The lifeline formed from these materials is light in weight, strong, has a high degree of heat resistance (capable of withstanding a temperature of about 450° C.), and does not rust. Therefore, it is semipermanently useful. As it is a tape, it is unlikely to get caught between its own coils on the reel, as opposed to a rope or wire, and can, therefore, have a length which is as long as about 100 m. It is very long, as compared with the conventionally employed ropes having a length of only about 30 to 40 m. The tape also has the effect of preventing swiveling of the device.

If a manual control member is provided for locking the centrifugal brake mechanism selectively, it is possible to control the descending speed of the device. It is also possible to stop the device at any desired position during its descent and it is, therefore, possible, for example, for a person descending from a 20-story or higher building to stop at a lower story and escape into the same building.

If a manual tape rewinding member is provided, the device is easier to make ready for reuse.

Regarding the embodiment of FIGS. 5 through 8, there is generally shown a portable slow descending device 106 having a right cover 50 and a left cover 52. When viewed in cross-section (See FIG. 7) the right cover 50 includes a protruding brake drum housing 80 in which the elements of the centrifugal brake mechanism are operatively positioned. It should be understood that, with the exception of positioning thereof with respect to a planetary gear acceleration unit 108, operation of the centrifugal brake mechanism is identical to that described in connection with the first embodiment.

Figure 5:
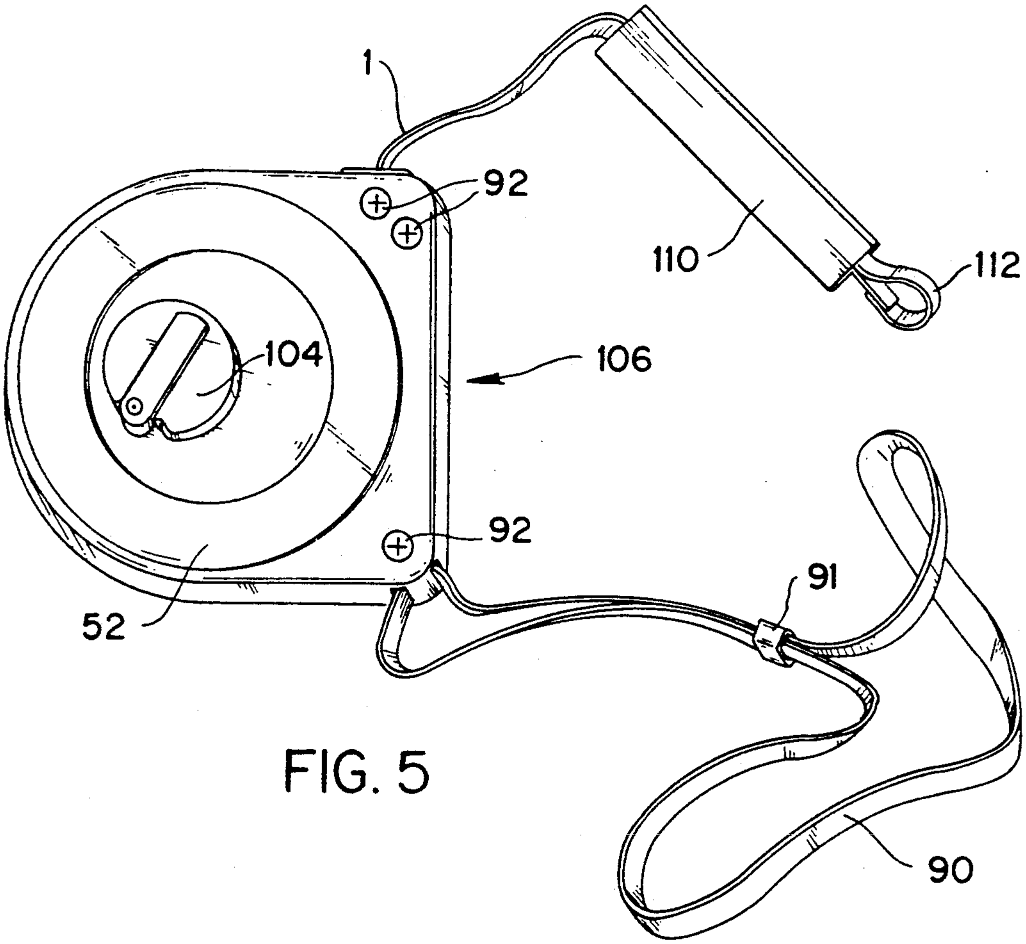
FIG. 5 is a left side view of a portable slow-descending device of a second preferred embodiment of the present invention.
Figure 6:
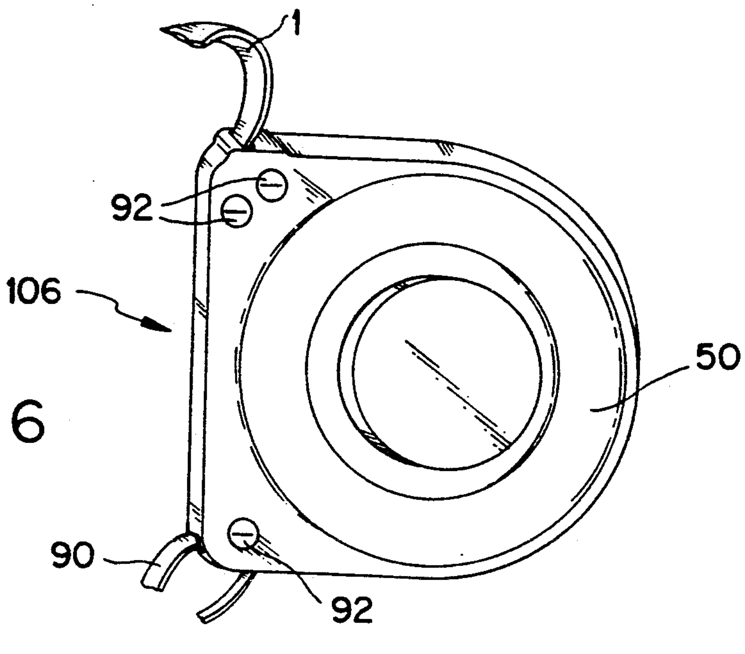
FIG. 6 is a right side view of the device shown in FIG. 5.
Figure 8:
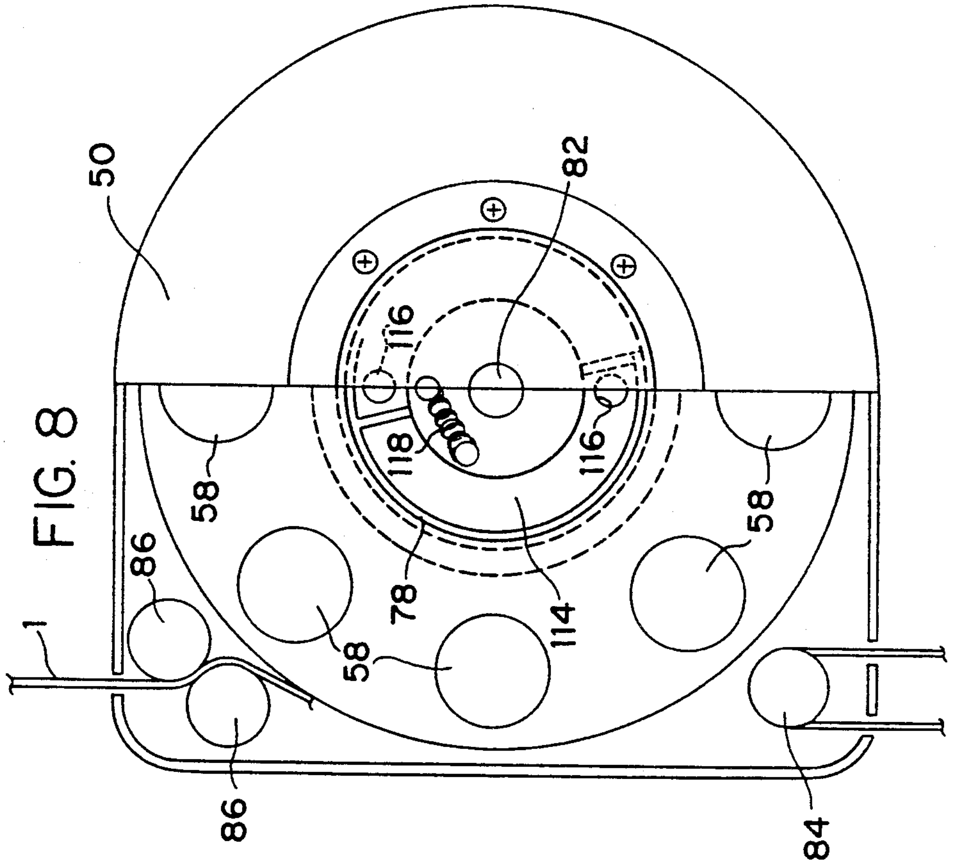
FIG. 8 is a right partially cutaway side view of FIG. 6, showing partial details of the centrifugal brake mechanism.

As particularly shown in FIGS. 5 and 6, the appearance of the slow-descending device 106 is aesthetically pleasant and streamlined, due to encapsulation of the working parts and the wound tape 1 within the right and left covers 50, 52, respectively. The covers are fitted together and secured by an internal spacer 84 via a plurality of appropriately placed screws 92. Encapsulation ensures a longer life for the slow descending device 106 by protecting the centrifugal brake mechanism, the planetary gear acceleration unit 108 and the tape 1 from exposure to the environment. Additionally, by encapsulation, the possibility of having clothing or appendages caught therein is avoided.

The reel ring 56 is the primary support for the superposedly wound tape 1 and includes reel plates 56 integrally formed therewith to ensure that successive layers of tape are evenly wound as defined by the reel plate parameters.

Figure 7:
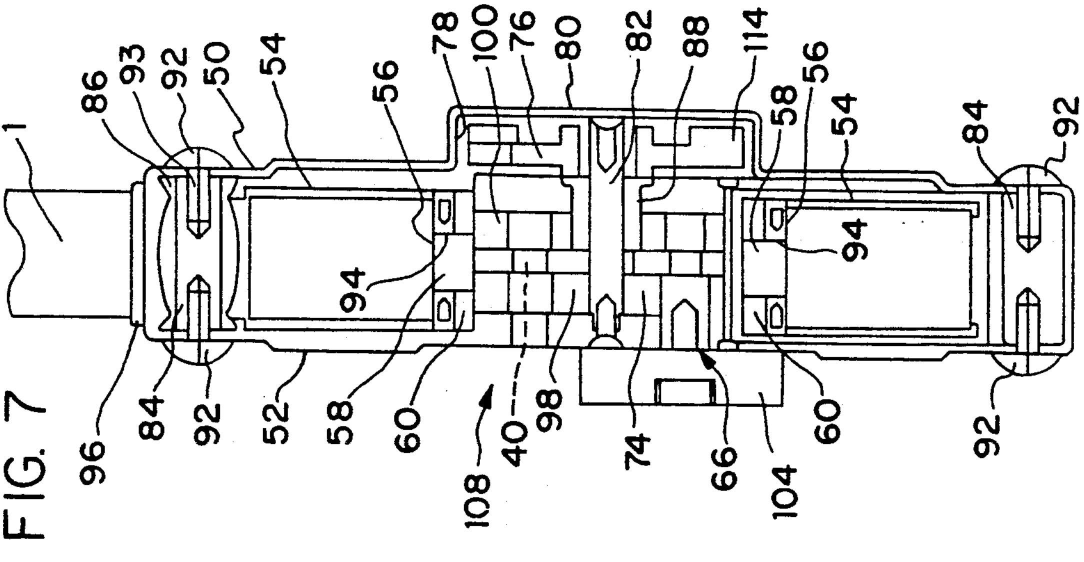
FIG. 7 is a cross-sectional view showing details of the relationship between opposing sides of the device shown in FIGS. 5 and 6.

A manual winding handle 104 is rotatably mounted to the left cover 52 for rewinding the dispensed tape 1 back into superposed layers on the reel ring 56 (shown in FIG. 7). Dispensing of the tape 1 occurs as described in connection with the first embodiment and is fed out between a pair of tape rollers 86 and through a tape guide 96 having a narrow elongated shape corresponding to the shape of the flat tape 1. Rewinding of the tape is achieved by merely cranking handle 104 in the appropriate direction. Rotation of the handle 104 rotates a central shaft 82 thereby engaging a manual winding pinion gear 66 with the first sun gear 74 and drawing the tape back onto the reel ring 56.

As shown primarily in FIGS. 5 and 6, there is a belt ring provided in a looped fashion around the spacer 84, and a slide buckle 91 assists in the adjustment of the belt ring 90 around a selected portion of the user's body, preferrably the waist thereof. For convenience in attachment to an immovable object prior to dispensing of the tape 1, there is provided a rigid end piece 110, and a clasp 112 at the end thereof. It should be understood that any suitably shaped clasp 112 may be used here, and the ultimate shape of the clasp may be determined by the environment in which the slow descending device 106 is most likely to be used.

FIG. 7 primarily shows the relationship of the planetary gear acceleration unit 108 to the internal gear mechanism 60. In particularly, rotation of the reel ring 56 is transmitted through a plurality of damper pins 58 to an internal gear 60. The damper pins 58 are buffered at the sides thereof by damper rubber 94. The internal gear 60 meshes with a set of pinion gears 98 which are rotatably mounted within the left cover 52 and on the left side of a fixed plate 40 separating the left and right sides of the slow descending device 106. The pinion gears 98 mesh with a first sun gear 74 which is rotated at a speed three to four times that of the reel ring 56. The first sun gear 74 is secured to a second pinion plate 72 which has a set of second pinion gears 100 which mesh with the internal gear 60 and with a second sun gear 88. Thus, the second sun gear rotates at a speed twelve to sixteen times that of the reel ring 56.

The centrifugal brake mechanism includes a centrifugal weight 14 which surrounds the shaft 82 of the second sun gear 88. The centrifugal weight 114 is of the type comprising two substantially semilunar members 114, 114, which are fixed at points 116 to a shoe holder 76 integrally connected to the shaft 82 as is the second sun gear 88 and normally urged radially inwardly toward each other by springs 118. The brake shoe lining is shown at element 78, and the brake mechanism further includes a cam 120 provided in its center.

The second embodiment is unique in its ability to protect the centrifugal brake mechanism within the brake drum 80 in a spaced-apart manner from the planetary gear acceleration unit 108. By spacing the two sides apart, the heat generated during descent and dispensing of the tape by the planetary gear acceleration unit is substantially maintained within the left side 52 of the device 106.

Further, since the centrifugal brake mechanism is protruding from the right side 50 of the housing, it will be kept cooler than it if was directly adjacent the gear unit 108. Overall functioning of the device is, therefore substantially improved and dispersion of generated heat is controlled.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable slow-descending device comprising:

a lifeline in the form of a tape made of a synthetic material;

a reel on which said lifeline is wound in superposing layers, said reel including a cylinder and opposing rims;

a planetary gear acceleration unit formed within said reel;

a centrifugal brake mechanism linked to said planetary gear acceleration unit within said reel and separated therefrom by a wall member;

a housing for rotatably supporting a shaft of said reel at opposing ends of the shaft, said housing substantially encapsulating said reel, said planetary gear acceleration unit and said centrifugal brake mechanism; and a projection formed within one side of said housing for receiving said centrifugal brake mechanism therein, whereby said centrifugal brake mechanism spaced apart from remaining components of said slow-descending device.

2. The portable slow-descending device as set forth in claim 1, wherein said housing includes a first opening from which said lifeline is dispensed and a second opening through which a suspension belt is looped, the suspension belt being adjustable to accommodate a victim securely therein.

3. The portable slow-descending device as set forth in claim 1, further including a rewind arm rotatably connected to the shaft of said reel and foldable against an outside surface of said housing, said rewind arm being actuable to manually rewind said lifeline around said reel subsequent to dispensing of said lifeline from said device.

4. The portable slow-descending device as set forth in claim 1, wherein said lifeline is made of aramid fibers.

5. The portable slow-descending device as set forth in claim 3, wherein said rewind arm is positioned on an opposite side of said housing from said centrifugal brake mechanism, thereby enabling spacing of said centrifugal brake mechanism away from remaining components of said device during use, thereby preventing excessive heat transfer between components.

* * * * *